United States Patent
Tran et al.

(10) Patent No.: US 6,556,223 B1
(45) Date of Patent: Apr. 29, 2003

(54) COMMUNICATION TEST SET WITH A GRAPHICAL USER INTERFACE THAT CAN SIMULTANEOUSLY PRESENT AND UPDATE TEST RESULTS OF A COMMUNICATION SIGNAL AT MULTIPLE LEVELS

(75) Inventors: Minh L. Tran, Gaithersburg, MD (US); Chris F. Brozenick, Germantown, MD (US)

(73) Assignee: TTC, a division of Dynatech, LLC, Germantown, MD (US)

( * ) Notice: Subject to any disclaimer, the term of this patent is extended or adjusted under 35 U.S.C. 154(b) by 0 days.

(21) Appl. No.: 09/372,878

(22) Filed: Aug. 12, 1999

(51) Int. Cl.[7] ................................................. G09G 5/00

(52) U.S. Cl. ...................... 345/804; 345/738; 345/805; 345/771; 345/781; 345/792

(58) Field of Search ................................. 345/771, 781, 345/792, 804, 965, 959, 733, 738, 805; 702/108, 117, 120, 124; 371/22; 379/21; 709/220, 223, 224, 249

(56) References Cited

U.S. PATENT DOCUMENTS

| | | | | |
|---|---|---|---|---|
| 4,301,536 A | * | 11/1981 | Favin et al. | 371/22 |
| 5,757,680 A | * | 5/1998 | Boston et al. | 364/579 |
| 5,808,920 A | | 9/1998 | Zwan et al. | |
| 6,298,118 B1 | * | 10/2001 | Liggett | 379/21 |
| 6,301,336 B1 | * | 10/2001 | Branton, Jr. et al. | 379/29.01 |
| 6,289,021 B1 | * | 11/2001 | Hesse | 370/409 |
| 6,329,998 B1 | * | 12/2001 | Han | 345/581 |

FOREIGN PATENT DOCUMENTS

WO   WO 99/21099   4/1999

OTHER PUBLICATIONS

Hewlett Packard: N1610A Service Advisor Portable Test Tablet, Publication Date Unknown, Product Brochure.
Digital Lightwave: ASA 312 Network Information Computer, Publication Date Unknown, Product Brochure.
TTC: "TTC Launches the T–Berd 2310" TTC Press Release 'Online'; Jan. 25, 1999, XP002166225 retrieved from the Internet URL:http://ttcweb1.ttc.com/ttc/about.nsf/pages/news__99, retrieved on 2001–04027 the whole document.
ZDNET: "Tools for monitoring, measuring and analyzing" Interactive Week, 'Online!, Feb. 22, 1999, XP002166226 retrieved from the Internet: URL:http://www.zdnet.com/intweek/stories/news/0,4164,391355,00.html, retrieved on Apr. 27, 2001, the whole document.
TTC: "T–Berd 3210 Communication Analyzer" Product Brochure and Specification Sheet, 'Online! Jan. 1999, XP002166224 retrieved from the Internet: URL: http://ttcweb1.ttc.com/ttc/prod.nsf/v wpdf/2310+SONET+Field+Services+Module+for +the+TTC+2000+Test+Pad/$File/tb2310. bro5.99.pdf?OpenElement.>'retrieved on Apr. 27, 2001!, pp. 2–5.

* cited by examiner

Primary Examiner—Kristine Kincaid
Assistant Examiner—Mylinh T Tran
(74) Attorney, Agent, or Firm—Reed Smith LLP (57) ABSTRACT

A programmable graphical user interface (GUI) for use in a communication test set which conducts line tests at different communication levels for both a primary signal and a secondary signal. The GUI includes four screens. The first screen displays test results for a first communication level. The second screen for displays test results for a second communication level. The third screen displays test results for a third communication level. And, the fourth screen displays test results for a fourth communication level. The GUI simultaneously displays the first screen, second screen, third screen and fourth screen to provide the user with a comprehensive view of the testing.

14 Claims, 11 Drawing Sheets

COMMUNICATION TEST SET WITH A GRAPHICAL USER INTERFACE THAT CAN SIMULTANEOUSLY PRESENT AND UPDATE TEST RESULTS OF A COMMUNICATION SIGNAL AT MULTIPLE LEVELS

BACKGROUND

A) Field of Invention

The present invention relates to a communication test set and more particularly to a communication test set with a graphical user interface which can simultaneously present and update test results of a communication signal at multiple levels.

B) Description of Related Art

Figure 1:
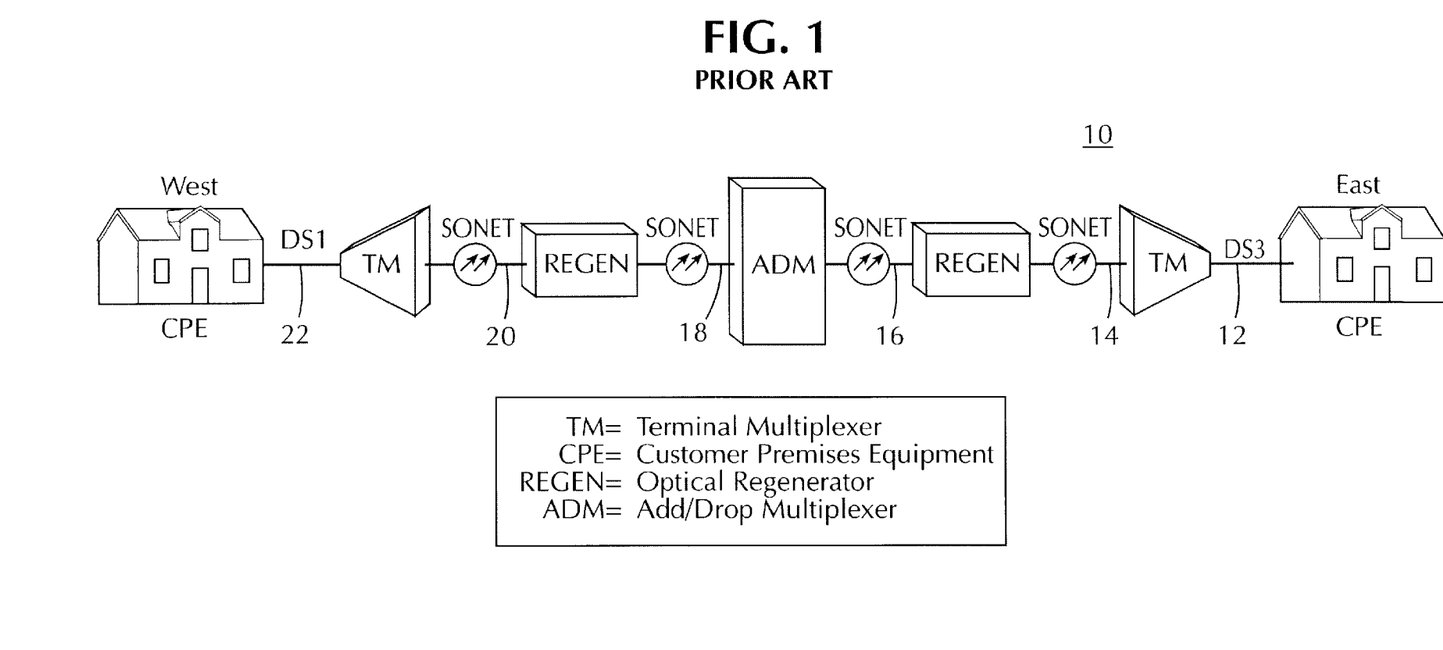
FIG. 1 illustrates a conventional communication network.

FIG. 1 shows a typical communication network 10. The communication network 10 employs a variety of communication links 12–22. Each of the communication links 12–22 can vary in type and design.

As is known in the art, the various types of communications links 12–22 enable communication according to a standardized communication protocol which allows the communications to occur at various levels, rates and formats. The standardized communication protocol, as defined on the date of this filing, is summarized below in the following table.

| Type of Communication Link | Communication Level | Communication Rate | Communication Format |
| --- | --- | --- | --- |
| Twisted Pair Copper Cable Link | DS0 | 64 kb/s | |
| T1 Link | DS1 | 1.544 mb/s | 24 DS0's |
| T3 Link | DS3 | 44.736 mb/s | 28 DS1's |
| Electrical or Fiber Optic Link | SONET | Up to 9.984 gb/s | Up to 192 DS3's |

Referring to the table above and as is known in the art, each communication level groups a varying number of communications signals from the preceding level to increase the communication rate. For example, communications at the DS1 level occurs by grouping 24 DS1 signals into a standardized communication protocol to achieve transmission at higher communication rate. Similarly, communications at the DS3 level occurs by grouping 28 DS1 signals into a standardized communication protocol for transmission at even a higher communication rate. This procedure can repeat itself to ultimately allow for communications at the SONET level.

Whenever the communication network 10 is being installed, under maintenance or under repair, there exists a need to test the various communication links 12–22. This testing process is typically conducted by field engineers with a device known as a communication test set.

Figure 2:
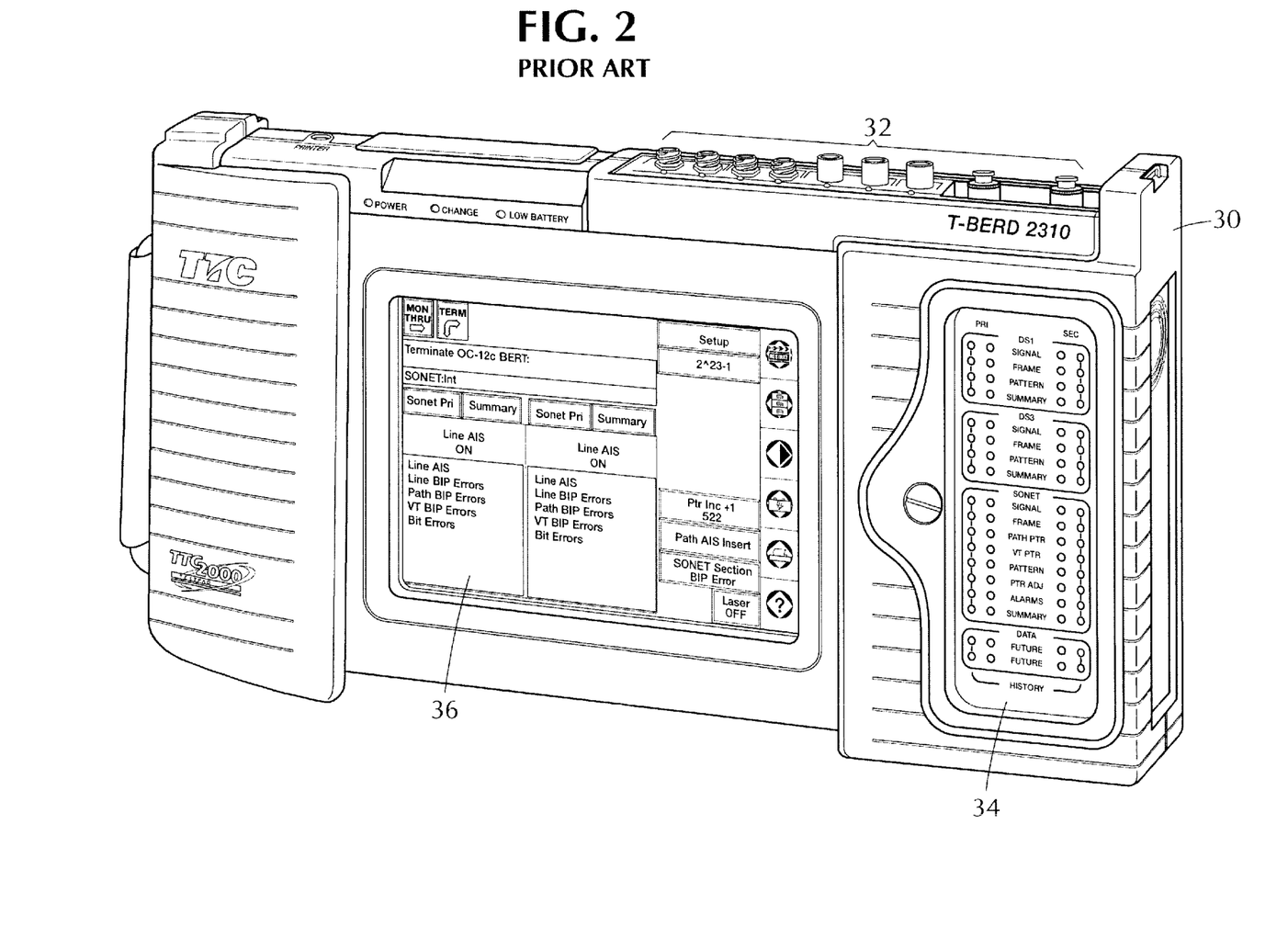
FIG. 2 illustrates a conventional communication test set.

FIG. 2 shows a conventional communication test set 30 which is used to test the communication links 12–22 contained within the communication network 10. The communication test set 30 generally includes a set of transmit and receive ports 32, a front panel of LED's 34, and a touch screen graphical-user-interface (GUI) 36.

The receive ports 32 are used to receive input signals from the communication links that will be tested. The receive ports 32 allow for the testing of two communication links simultaneously. The two signals received by the ports 32 from the two communication links are generally referred to as the primary signal and the secondary signal.

The front panel of LED's 34 provide immediate visual feedback on the status of a test. Green LED's indicate that the a signal is present and the communication test set is synchronized to a network. Red LED's indicate that errors and alarms have been detected by the communication test set 30. The LED's also allow a user to monitor the progress of a test from a distance which in turn allows the engineer to perform other functions at the same time.

Figure 3:
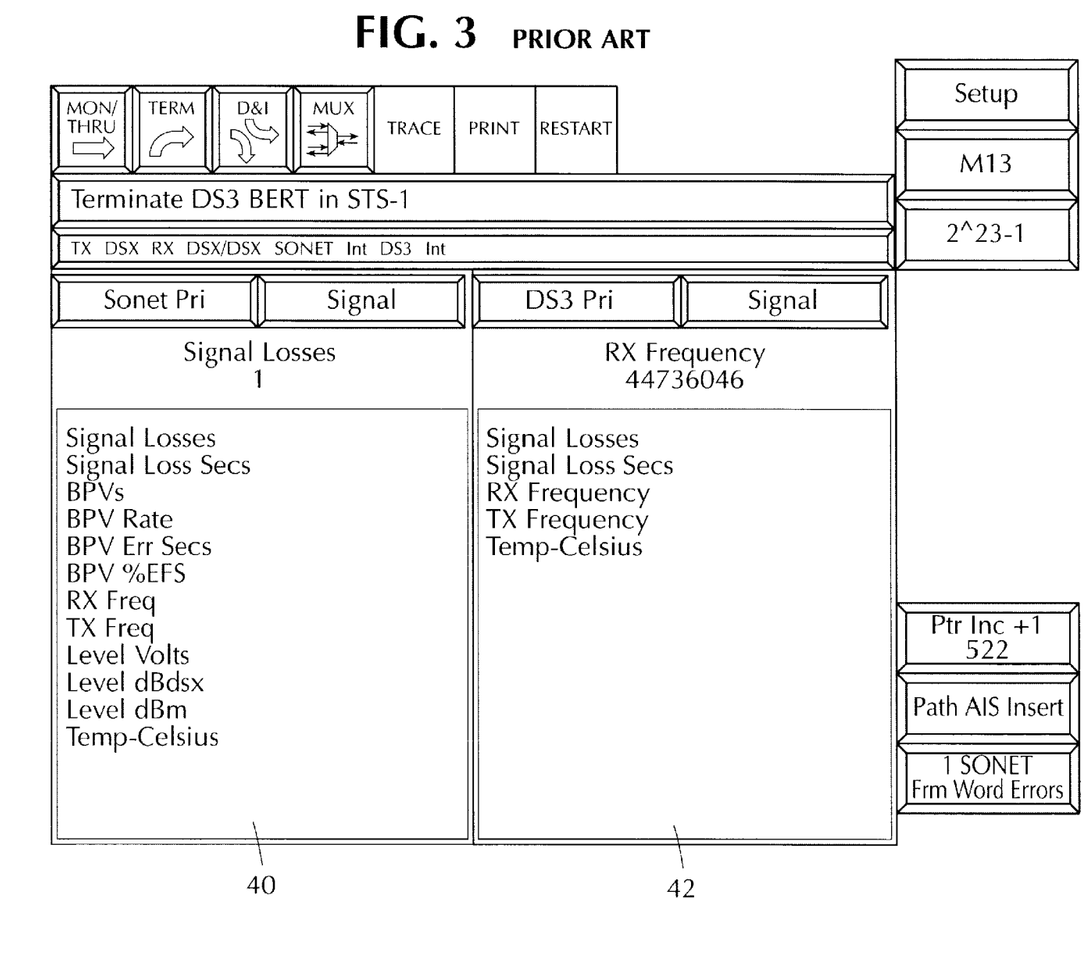
FIG. 3 illustrates a conventional GUI used by the communication test set shown in FIG. 2.
Figure 4:
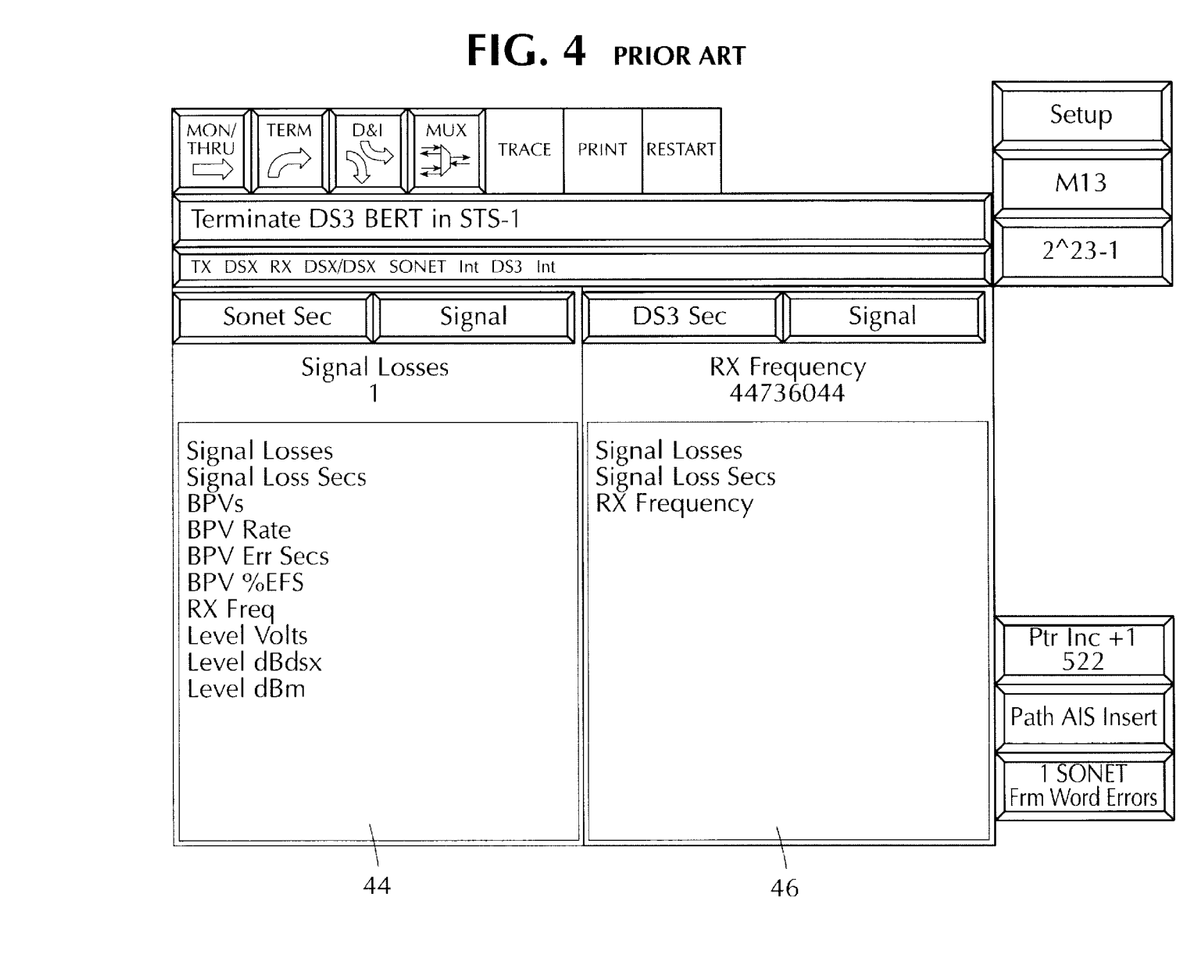
FIG. 4 illustrates a conventional GUI used by the communication test set shown in FIG. 2.

The touch screen GUI 36 contains a number of icons which, among other things, allow a user to view information related to the test results. FIG. 3 show a conventional GUI 36 which displays information relating to the test results of the primary signal. FIG. 4 shows a conventional GUI 36 which displays information relating to the test results of the secondary signal.

In the example shown in FIG. 3, the primary signal being tested is at the SONET level. Therefore, as described above, this signal will include groups of communications that are being processed at the lower levels (i.e., the DS3, DS1 and DS0 levels).

To allow the user to view the test results at both the SONET level and one of the lower levels, the conventional GUI 36 is split into two screens 40 and 42. The first screen 40 displays the test results of the data communications occurring at the SONET level, whereas, the second screen 42 displays the test results of the data communications occurring at DS3 communication level.

A similar test result occurs for the secondary signal being tested. In particular, in the example shown in FIG. 4, the secondary signal being tested is also at the SONET level. Therefore, To allow the user to view test results at both the SONET level and one of the lower levels, the conventional GUI 36 is split into two screens 44 and 46. The first screen 44 displays the test results of the data communications occurring at the SONET level, whereas, the second screen 46 displays the test results of the data communications occurring at DS3 communication level.

Although not shown in FIGS. 3 and 4, the conventional GUI 36 can be configured by a user to view any two levels of a communication. In particular, the GUI 36 shown in FIGS. 3 and 4 can instead be configured to view the DS3 and DS1 levels simultaneously or, alternatively, the GUI 36 can be configured to view DS1 and DS0 simultaneously.

The conventional GUI 36 described above does, however, have significant drawbacks. In particular, the conventional GUI 36 only allows a user of the communication test set 10 to simultaneously view the test results of a signal at two levels.

This limitation is of particular significance when the communication is occurring at the SONET level and there are at least three lower levels of communication occurring that require testing. Thus, when a communication is occurring at the SONET level, the field test engineer has to reprogram the GUI 36 every time he or she wants to view more than two different levels of a communication. In view of this problem there currently exists a need for a communication test set with a GUI that will allow a user to simultaneously view the test results of a communication at multiple levels.

OBJECTS AND SUMMARY OF THE INVENTION

It is accordingly an object of the present invention to provide a communication test set that will allow a user to simultaneously view and update the test results of a communication at multiple levels.

It is another object of the invention to provide a communication test set that will allow a user to select, store and transfer the specific test results of the he or she wants to view at these levels.

It is yet another object of the invention to provide a communication test set that will automatically configure the GUI to show the appropriate number of communication levels based on the number of communication levels contained within the input signal.

It is still another object of the invention to provide a communication test set that will use a GUI that color codes the those levels of a communication being tested to indicate that alarms and/or errors are occurring in the signal.

In accordance with one embodiment of the invention, a programmable GUI is disclosed for use in a communication test set which conducts line tests at different communication levels for both a primary signal and a secondary signal. The GUI comprises: a first screen for displaying test results for a first communication level; a second screen for displaying test results for a second communication level; a third screen for displaying test results for a third communication level; and a fourth screen for displaying test results for a fourth communication level; wherein, the GUI simultaneously displays the first screen, second screen, third screen and fourth screen.

In accordance with another aspect of this embodiment of the invention, the first screen, second screen, third screen and fourth screen display test results for both the primary and secondary signal.

In accordance with still another aspect of this embodiment of the invention, the test results presented in the first screen represent one group of test results that are selected from a plurality of groups of test results.

In accordance with yet another aspect of this embodiment of the invention, the test results presented in the second screen represent one group of test results that are selected from a plurality of groups of test results.

In accordance with even still another aspect of this embodiment of the invention, the test results presented in the third screen represent one group of test results that are selected from a plurality of groups of test results.

In accordance with even yet another aspect of this embodiment of the invention, the test results presented in the fourth screen represent one group of test results that are selected from a plurality of groups of test results.

In accordance with another aspect of this embodiment of the invention, the first communication level, second communication level, third communication level and fourth communication level can be selected from a group of communication levels.

In accordance with still another aspect of this embodiment of the invention, any one of the first, second third and fourth screens display certain colors when the screens contain tests results that have errors.

In accordance with another embodiment of the invention, a communication test set is disclosed which conducts tests of a signal at different communication levels, the communication test comprises: a set of input ports to receive a primary and secondary signal for testing; a touch screen GUI which automatically configures itself to show each level of communication contained within the primary and secondary signal.

In accordance with another aspect of this embodiment of the invention, when one of the primary and secondary signal contains four communication levels, the GUI comprises: a first screen for displaying test results for first a first communication level; a second screen for displaying test results for a second communication level; a third screen for displaying test results for a third communication level; and a fourth screen for displaying test results for a fourth communication level; where the first screen, second screen, third screen and fourth screen are displayed simultaneously by the GUI.

In accordance with yet another aspect of this embodiment of the invention, any one of the first, second third and fourth screens display certain colors when the screens contain tests results that have errors.

In accordance with yet another embodiment of the invention, a programmable GUI for use in a communication test set is disclosed which conducts tests of a signal at different communication levels, the GUI comprises: a primary screen for simultaneously displaying tests of a first communication level, a second communication level, a third communication level, and a fourth communication level; and a plurality of secondary screens which allow a user of the communication test set to select test results that are displayed on the primary screen.

In accordance with another aspect of this embodiment of the invention, the primary screen further comprises: a first subscreen for displaying test results of the first communication level; a second subscreen for displaying test results of the second communication level; a third subscreen for displaying test results of the third communication level; and a fourth subscreen for displaying test results of the fourth communication level.

In accordance with yet another aspect of this embodiment of the invention, one of the plurality of subscreens allows the user to select one group of test results from a plurality of groups of test results.

BRIEF DESCRIPTION OF THE DRAWINGS

The accompanying drawings are included to provide an understanding of the invention and constitute a part of the specification.

DETAILED DESCRIPTION OF THE INVENTION

Figure 5:
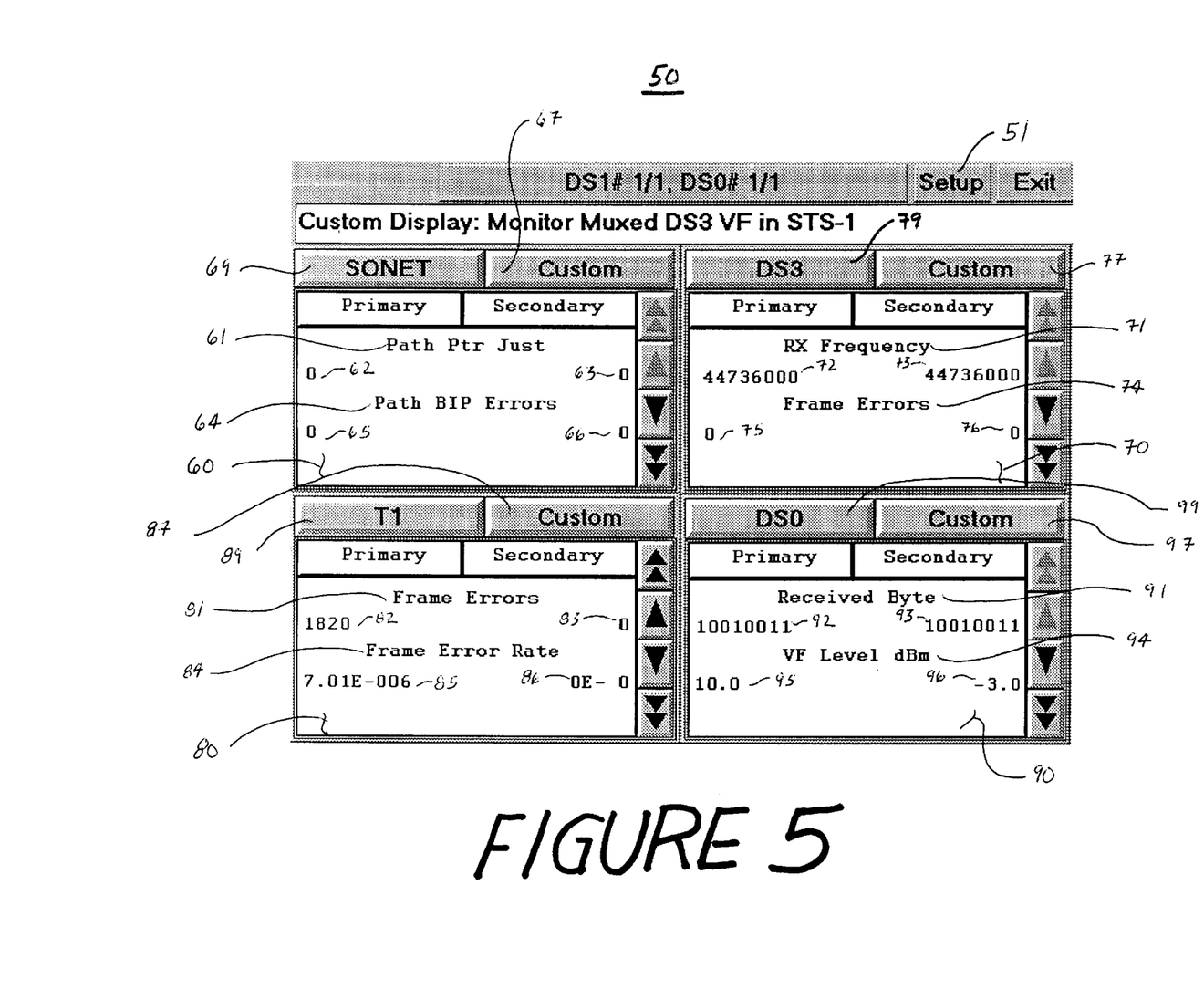
FIG. 5 illustrates a screen of a GUI developed in accordance with present invention.

FIG. 5 shows a GUI 50 for a communication test set developed in accordance with the present invention. The GUI 50 is split into four screens 60, 70, 80 and 90. The four screens 60 through 90 allow the user to simultaneously view the test results at the SONET level, DS3 level, DS1 level and DS0 level. Each screen 60 through 90 additionally presents the tests results for both the primary and secondary signals. Each of the screens 60 through 90 are described in detail below.

The first screen 60 displays the test results of the data communications occurring at the SONET level for both the primary and secondary communication signal being tested. In this example, the screen 60 displays two sets of test results for the primary and secondary signal. The first set of test results is shown under heading 61 and the second set of test results is shown under heading 64.

The first set of test results shown under heading 61 relate to the path pointer justification of the communication signal being tested. The results of this test for the primary signal are shown on the left-hand side of the screen and are denoted by reference numeral 62. The results of this test for the secondary signal are shown on the right hand side of the screen and are denoted by reference numeral 63.

The second set of test results are shown under the heading 64 and relate to the path bit interleaved parity (BIP) errors of the communication signal being tested. The results of this test for the primary signal are shown on the left-hand side of the screen and are denoted by reference numeral 65. The results of this test for the secondary signal are shown on the right hand side of the screen and are denoted by reference numeral 66.

The GUI 50, as will be described in greater detail below, can be configured to display numerous test results for a communication signal being tested at the SONET level. These test results can be viewed simply by touching the scroll down buttons contained within the first screen 60. In this specific example, however, the user has configured the GUI 50 only to display the test results for the two tests described above.

The second screen 70 displays the test results of the data communications occurring at the DS3 level for both the primary and secondary communication link being tested. In this example, the screen 70 displays two sets of test results for the primary and secondary signal. The first set of test results is shown under heading 71 and the second set of test results is shown under heading 74.

The first set of test results shown under heading 71 relate to the received frequency of the communication signal being tested. The results of this test for the primary signal are shown on the left-hand side of the screen and are denoted by reference numeral 72. The results of this test for the secondary signal are shown on the right hand side of the screen and are denoted by reference numeral 73.

The second set of test results are shown under the heading 74 and relate to the frame errors of the communication signal being tested. The results of this test for the primary signal are shown on the left-hand side of the screen and are denoted by reference numeral 75. The results of this test for the secondary signal are shown on the right hand side of the screen and are denoted by reference numeral 76.

The GUI 50, as will be described in greater detail below, can be configured to display numerous test results for a communication signal being tested at the DS3 level. These test results can be viewed simply by touching the scroll down buttons contained within the second screen 70. In this specific example, however, the user has configured the GUI 50 only to display the test results for the two tests described above.

The third screen 80 displays the test results of the data communications occurring at the DS1 level for both the primary and secondary communication link being tested. In this example, the screen 80 displays two sets of test results for the primary and secondary signal. The first set of test results is shown under heading 81 and the second set of test results is shown under heading 84.

The first set of test results shown under heading 81 relate to frame errors detected in the communication signal being tested. The results of this test for the primary signal are shown on the left-hand side of the screen and are denoted by reference numeral 82. The results of this test for the secondary signal are shown on the right hand side of the screen and are denoted by reference numeral 83.

The second set of test results are shown under the heading 84 and relate to the frame error rate of the communication signal being tested. The results of this test for the primary signal are shown on the left-hand side of the screen and are denoted by reference numeral 85. The results of this test for the secondary signal are shown on the right hand side of the screen and are denoted by reference numeral 86.

The GUI 50, as will be described in greater detail below, can be configured to display numerous test results for a communication signal being tested at the DS1 level. These test results can be viewed simply by touching the scroll down buttons contained within the third screen 80. In this specific example, however, the user has configured the GUI 50 only to display the test results for the two tests described above.

The fourth screen 90 displays the test results of the data communications occurring at the DS0 level for both the primary and secondary communication link being tested. In this example, the screen 90 displays two sets of test results for the primary and secondary signal. The first set of test results is shown under heading 91 and the second set of test results is shown under heading 94.

The first set of test results shown under heading 91 relate to the received bytes of the communication signal being tested. The results of this test for the primary signal are shown on the left-hand side of the screen and are denoted by reference numeral 92. The results of this test for the secondary signal are shown on the right hand side of the screen and are denoted by reference numeral 93.

The second set of test results are shown under the heading 94 and relate to the voice frequency level of the communication signal being tested. The results of this test for the primary signal are shown on the left-hand side of the screen and are denoted by reference numeral 95. The results of this test for the secondary signal are shown on the right hand side of the screen and are denoted by reference numeral 96.

The GUI 50, as will be described in greater detail below, can be configured to display numerous test results for a communication signal being tested at the DS0 level. These test results can be viewed simply by touching the scroll down buttons contained within the fourth screen 90. In this specific example, however, the user has configured the GUI 50 only to display the test results for the two tests described above.

It is important to note that test results described above that are presented in the screens 60 through 90 are updated by the GUI 50 once every second. This ensures that the user of the test set will always be provided with timely and accurate information.

From the foregoing it is apparent that the GUI 50 developed in accordance with the present invention can simultaneously present and update the test results of a communication at multiple levels for both the primary and secondary signal. This feature provides a significant advantage over conventional GUI's—which only allowed for the simultaneous presentation of test results at two levels for one signal—given that a user can obtain a complete set of information about the communication without having to constantly reconfigure the GUI to see test results at different levels.

Figure 6:
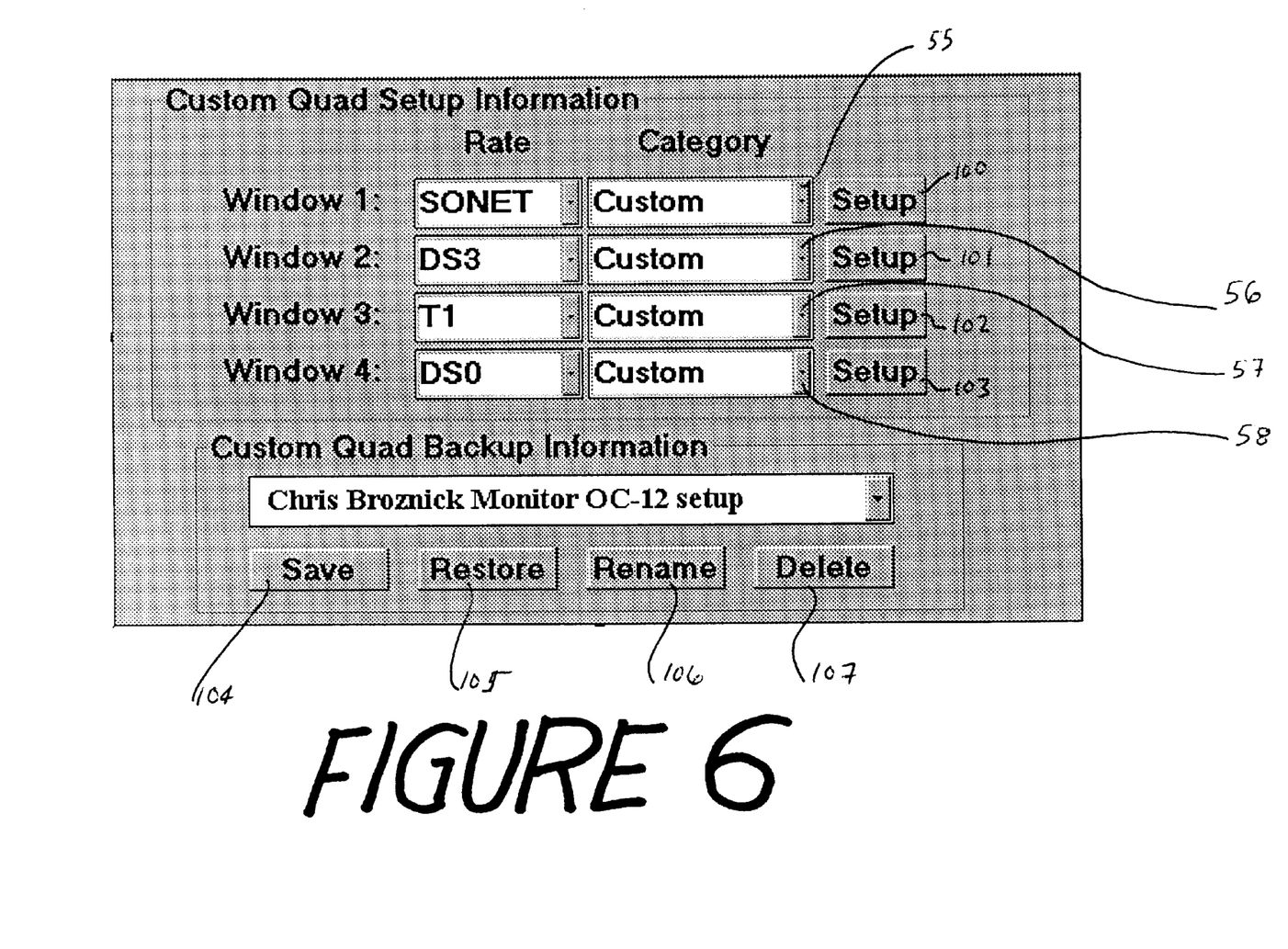
FIG. 6 illustrates a screen of a GUI developed in accordance with present invention.

As indicated above, each of the screens 60, 70, 80 and 90 can be configured by the user to present only those test results that are of interest to user. For example, the user can customize each of the screens 60 through 90 by touching the setup button 51. Once the setup button 51 is depressed, a custom results screen can be selected. FIG. 6 shows an example of the custom results screen 53 produced by the GUI 50 when the setup button 51 is depressed.

Referring to FIG. 6, for each of the screens 60 through 90, a category feature is provided by scroll bars 55, 56, 57 and 58 respectively. In particular, by depressing scroll bars 55 through 58, the user is permitted to select a category-of-results for each of the four screens 60 through 90. The details of this category-of-results feature is described below.

Referring to FIG. 6, the category-of-results feature of the GUI 50 developed in accordance with the present invention has different category-of-result options depending on the rate of the communication signal being tested. In particular, for the SONET rate which is displayed in screen 60, the category-of-results feature provides the user with ten options. The ten options include an "ALL" category-of-results, a "SIGNAL" category-of-results, a "LOGIC" category-of-results, a "SECTION" category-of-results, a "LINE" category-of-results, a "PATH" category-of-results, a "PATH TRACE" category-of-results, a "VT" category-of-results, a "TIME" category-of-results, and a "CUSTOM" category-of-results.

In the example shown in FIG. 6, the user has selected the "CUSTOM" category of results for the SONET level. When this category is selected and the user depresses the setup button 100 to the right of the scroll bar 55, a screen appears which allows the user to select specific tests results for viewing.

Figure 7:
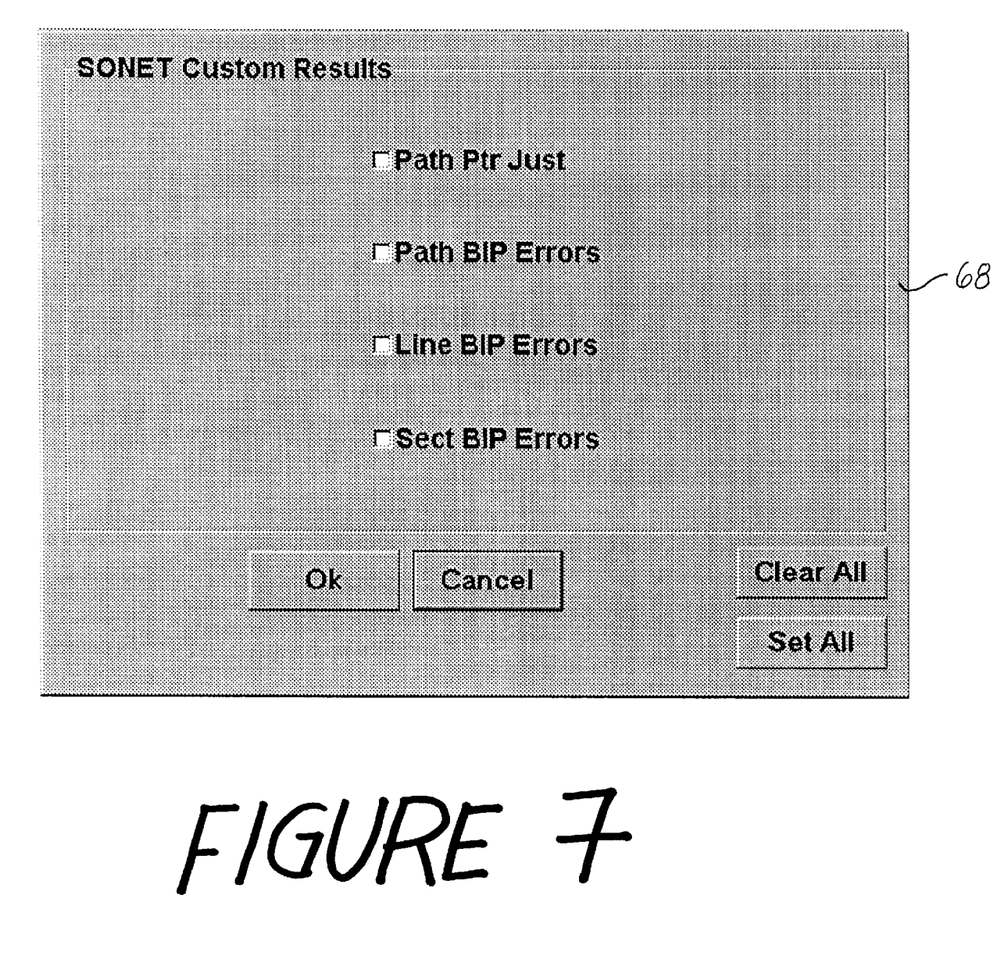
FIG. 7 illustrates a screen of a GUI developed in accordance with present invention.

FIG. 7 shows an example of a screen 68 produced by the GUI 50 when the setup button 100 is depressed after the user has selected he "CUSTOM" category-of-results for window 1. The user can select all of the tests results, none of the tests results, or a select group of the tests results depending on the needs and desire of the user. This selection process takes place simply by touching the screen. In this case, the screen 68 provides the user the option of selecting test results shown as Path Ptr Just, Path BIP Errors, Line BIP Errors and Sect BIP Errors.

As would be apparent to one of ordinary skill in the art, screens similar to screen 68 appear when the setup button 100 is depressed after one of the remaining ten category-of-results are selected for window 1.

Referring again to FIG. 6, for the DS3 rate which is displayed in screen 70, the category-of-results features provides the user with eight options. Again, these eight options are presented to the user by depressing the scroll bar 56. The eight options include an "ALL" category-of-results, a "SIGNAL" category-of-results, "LOGIC" category-of-results, a "BPV" category-of-results, "FRAME" category-of-results, a "PARITY" category-of-results, a "TIME" category-of-results, and a "CUSTOM": category-of-results.

In the example shown in FIG. 6, the user has selected the "CUSTOM" category-of-results for the DS3 level. When this category is selected and the user depresses the setup button 101 to the right of the scroll bar 56, a screen appears which allows the user to select specific tests results for viewing.

Figure 8:
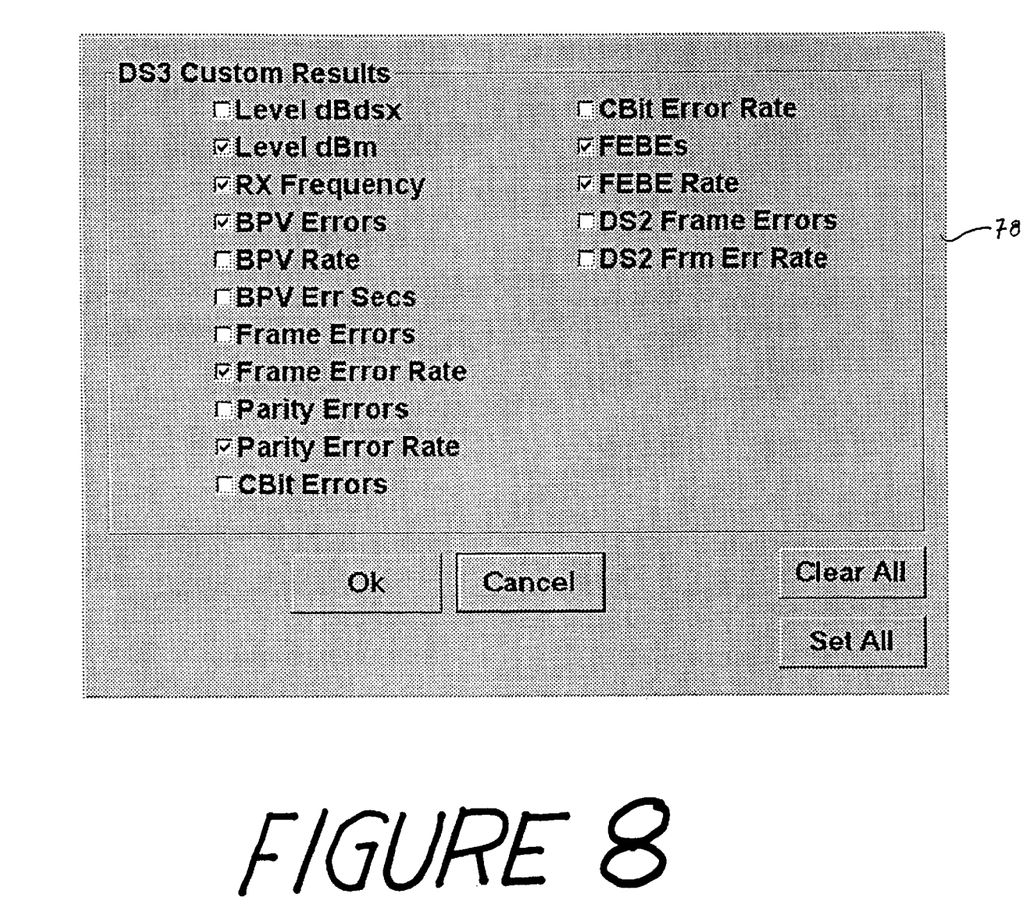
FIG. 8 illustrates a screen of a GUI developed in accordance with present invention

FIG. 8 shows an example of a screen 78 produced by the GUI 50 when the setup button 101 is depressed after the user has selected the "CUSTOM" category-of-results for window 2. The user can select all of the tests results, none of the tests results, or a select group of the tests results depending on the needs and desire of the user. This selection process takes place simply by touching the screen. In this case, the screen 78 provides the user has the option of selecting test results shown as Level dBdsx, Level dBm, RX Frequency, BPV Errors, BPV Rate, BPV Err Secs, Frame Errors, Frame Error Rate, Parity Errors, Parity Error Rate, CBit Errors, CBit Error Rate, FEBEs, FEBE Rate, DS2 Frame Errors and DS2 Frm Err Rate.

As would be apparent to one of ordinary skill in the art, screens similar to screen 78 appear when the setup button 101 is depressed after one of the remaining seven category-of-results are selected for window 2.

Referring again to FIG. 6, for the DS1 rate which is displayed in screen 80, the category-of-results features provides the user with seven options. These seven options are presented to the user by depressing scroll bar 57. The seven options include an "ALL" category-of-results, a "SIGNAL" category-of-results, a "LOGIC" category-of-results, a "BPV" category-of-results, a "FRAME" category-of-results, a "TIME" category-of-results, and a "CUSTOM" category-of-results.

In the example shown in FIG. 6, the user has selected the "CUSTOM" category of results for the DS1 level. When this category is selected and the user depresses the setup button 102 to the right of the scroll bar 57, a screen appears which allows the user to select specific tests results for viewing.

Figure 9:
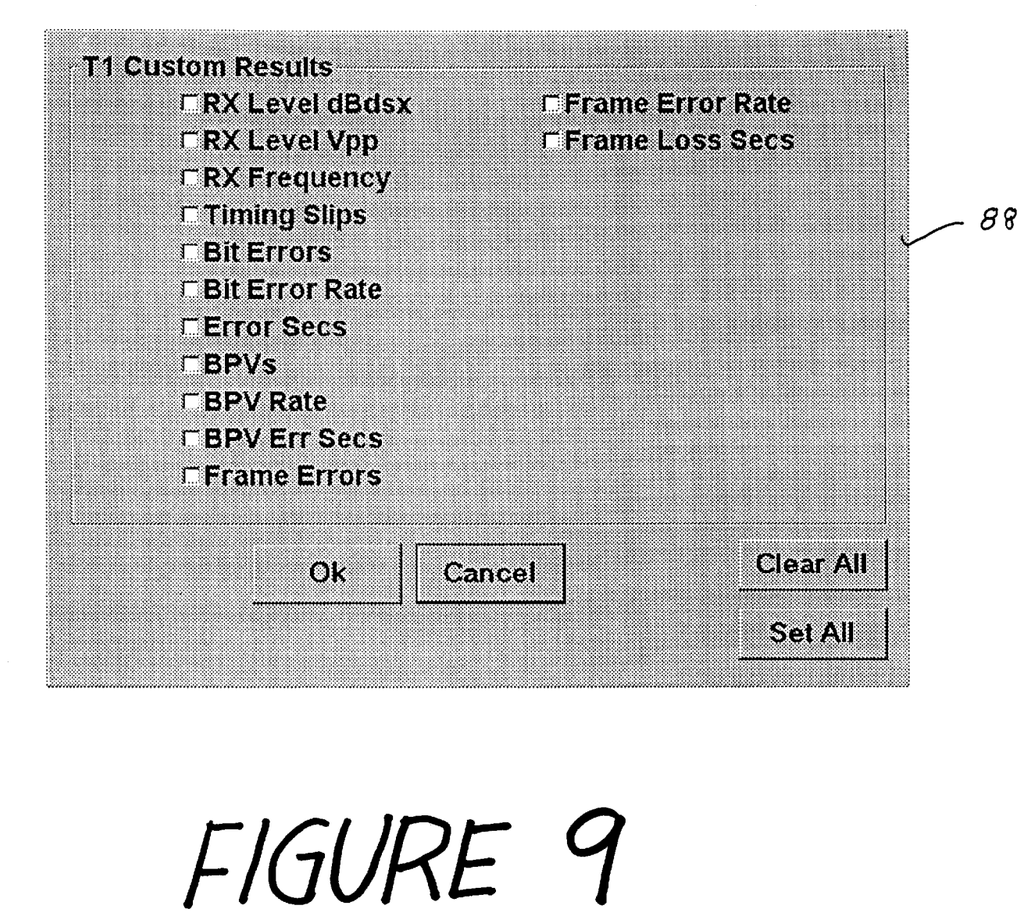
FIG. 9 illustrates a screen of a GUI developed in accordance with present invention.

FIG. 9 shows an example of a screen 88 produced by the GUI 50 when the setup button 102 is depressed after the user has selected the "CUSTOM" category-of-results for window 3. The user can select all of the tests results, none of the tests results, or a select group of the tests results depending on the needs and desire of the user. This selection process takes place simply by touching the screen. In this case, the screen 88 provides the user the option of selecting test results shown as RX Level dBdsx, RX Level Vpp, RX Frequency, Timing Slips, Bit Errors, Bit Error Rate, Error Secs, BVPs, BPV Rate, BPV Err Secs, Frame Errors, Frame Error Rate and Frame Loss Secs.

As would be apparent to one of ordinary skill in the art, screens similar to screen 88 appear when the setup button 102 is depressed after one of the remaining six category-of-results are selected for window 3.

Referring again to FIG. 6, for the DS0 rate which is displayed in screen 90, the category-of-results features provides the user with five options. These five options are presented to the user by depressing the scroll bar 58. The five options include an "ALL" category-of-results, a "CHANNEL" category-of-results, a "SIGNALING" category-of-results, a "DDS" category-of-results, and a "CUSTOM" category-of-results.

In the example shown in FIG. 6, the user has selected the "CUSTOM" category of results for the DS0 level. When this category is selected and the user depresses the setup button 103 to the right of the scroll bar 58, a screen appears which allows the user to select specific tests results for viewing.

Figure 10:
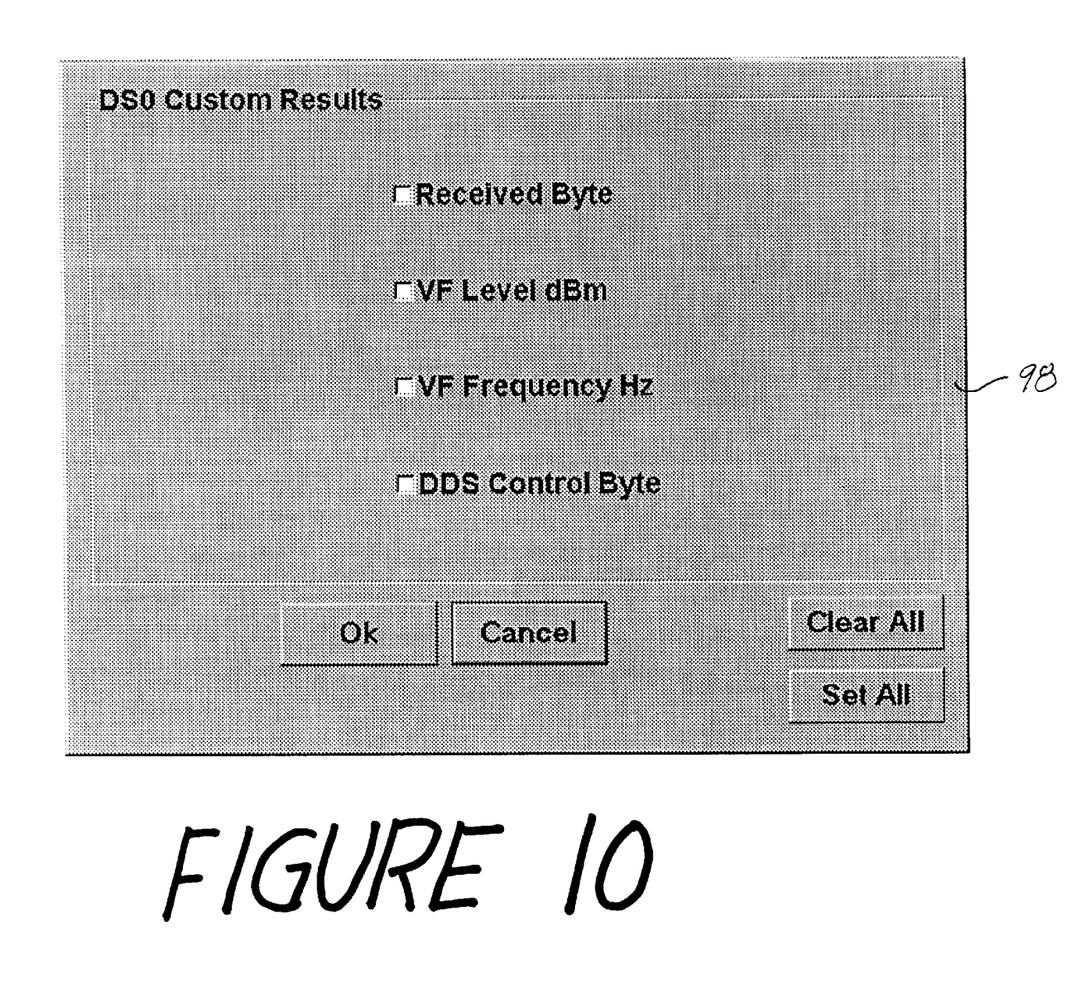
FIG. 10 illustrates a screen of a GUI developed in accordance with present invention; and, FIG. 11 illustrates a screen of a GUI developed in accordance with present invention.

FIG. 10 shows an example of a screen 98 produced by the GUI 50 when the setup button 103 is depressed after the user has selected the "CUSTOM" category-of-results for window 4. The user can select all of the tests results, none of the tests results, or a select group of the tests results depending on the needs and desire of the user. This selection process takes place simply by touching the screen. In this case, The screen 98 provides the user the option of selecting test results shown as Received Byte, VF Level, VF Frequency Hz and DDS Control Byte.

As would be apparent to one of ordinary skill in the art, screens similar to screen 98 appear when the setup button 103 is depressed after one of the remaining four category-of-results are selected for window 4.

Referring to FIG. 6, it is important to point out that once a user configure the GUI 50 to display the information that is of interest to the user, this configuration can be saved to a setup file to prevent the user from having to reperform the configuration procedure again in the future. To create a setup file, the user simply pushes the save button 104 and then defines a file name. This file can later be restored, renamed or deleted by using buttons 105, 106 or 107 respectively. The setup file can also be imported to other test set devices.

It is important to point out that the test results shown on screens 60 through 90 that are discussed above are different from the alarms and errors shown as flashing LED's in FIG. 2. In particular, the flashing LED's simply provide status information about a signal being tested and do not provide detailed quantitative data such as the types made available on screens 60 through 90. Moreover, as discussed above, the quantitative data provided on screens 60 through 90 is updated by the GUI 50 once per second to provide the user of the test set with complete and accurate tests results on a continual basis.

Figure 11:
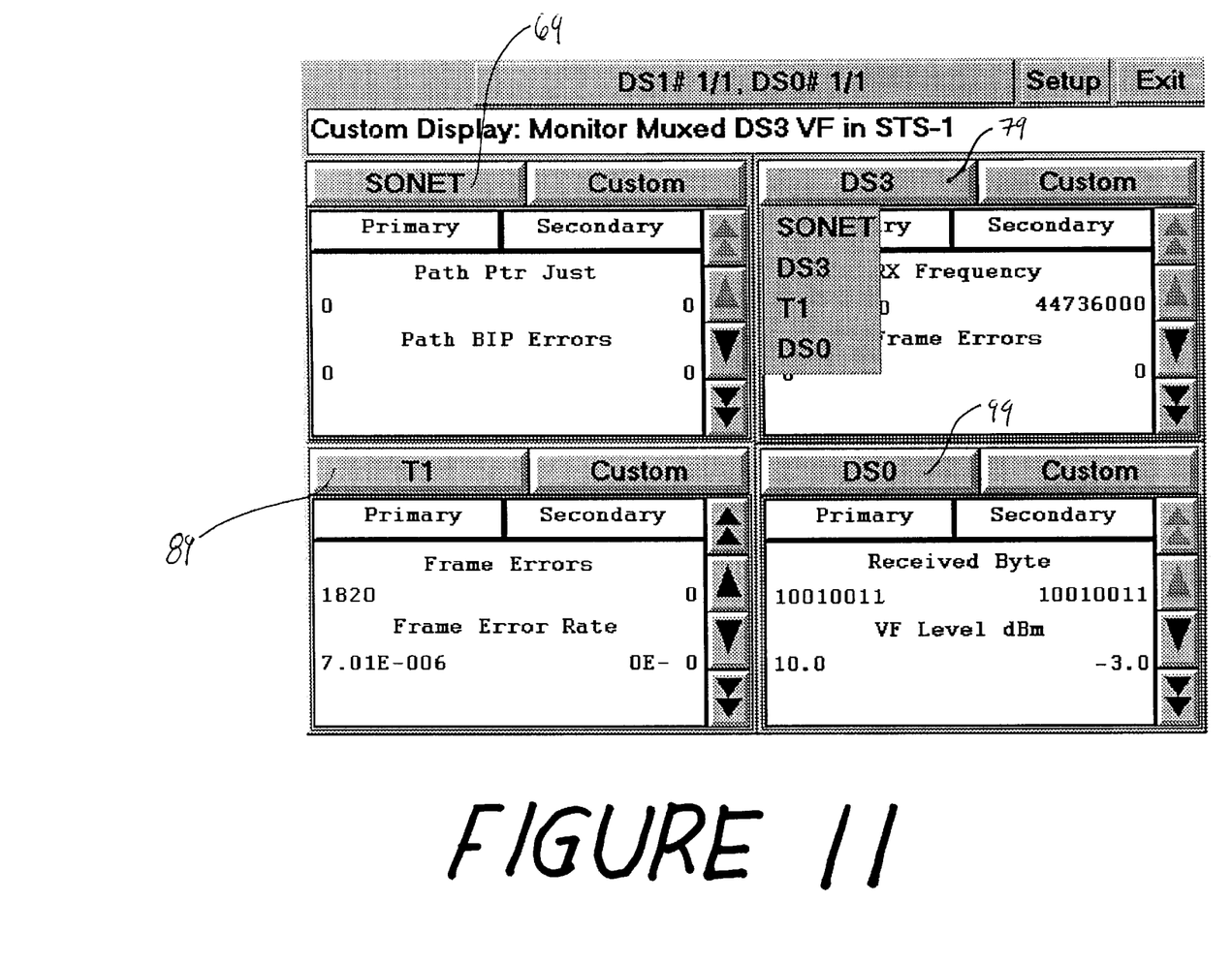

Referring to FIG. 11, each of the screens 60, 70, 80 and 90 respectively contain rate buttons 69, 79, 89 and 99. Once these rate buttons are depressed by the user, the communication level of interest to the user will be displayed in the screen. For example, if the rate button 79 is depressed the user will have the option of selecting the SONET level, the DS3 level, the DS1 level or DS0 level. In this example, if the SONET level were selected, then both screens 60 and 70 would display test results related to this communications. From this example is apparent that the GUI 50 developed in accordance with the present invention can be configured to show test results in using any possible combination of the four communication levels discussed herein.

The GUI 50 developed in accordance with the present invention also has an auto configure mode. When this mode is selected, the GUI 50 will automatically configure the screen in a manner that coincides with the type of communication signal being tested.

For example, if the communication signal being tested is operating at the DS3 level, the auto configure feature of the GUI 50 would detect this fact and automatically configure the screen to show the DS3 level, the DS1 level and the DS0 level (i.e., all levels of the communication). Similarly, if the communication signal being tested was operating at the SONET level, as was the case described above with reference to FIG. 5, the auto configure feature would automatically configure the screen to show the SONET level, the DS3 level, the DS1 level and the DS0 level.

The GUI 50 developed in accordance with the present invention also has an alarm feature. This feature, again referring to FIG. 5, color codes those screens which have test results that have errors. This feature is particularly useful given that it allows a user to monitor the progress of a test from a distance simply by looking for colors on the screen of a communication test set.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

We claim:

1. A programmable graphical user interface (GUI) for use in a communication test set which conducts line tests at different communication levels for a primary signal representing a first communication line, with each communication level representing a communication format at a predetermined speed, said GUI comprising:

a first screen for displaying test results for a first communication level contained in the first communication line;

a second screen for displaying test results for a second communication level contained in the first communication line;

a third screen for displaying test results for a third communication level contained in the first communication line; and a fourth screen for displaying test results for a fourth communication level contained in the first communication line;

wherein, said GUI simultaneously displays the first screen, second screen, third screen and fourth screen.

2. The programmable GUI of claim 1, wherein said first screen, second screen, third screen and fourth screen display test results for the primary signal and a secondary signal representing a second communication line.

3. The programmable GUI of claim 2, wherein the test results presented in said first screen represent one group of test results that are selected from a plurality of groups of test results.

4. The programmable GUI of claim 2, wherein the test results presented in said second screen represent one group of test results that are selected from a plurality of groups of test results.

5. The programmable GUI of claim 2, wherein the test results presented in said third screen represent one group of test results that are selected from a plurality of groups of test results.

6. The programmable GUI of claim 2, wherein the test results presented in said fourth screen represent one group of test results that are selected from a plurality of groups of test results.

7. The programmable GUI of claim 2, wherein said first communication level, second communication level, third communication level and fourth communication level can be selected from a group of communication levels.

8. The programmable GUI of claim 2, wherein any one of said first, second third and fourth screens display certain colors when said screens contain tests results that have errors.

9. A programmable graphical user interface (GUI) for use in a communication test set which conducts tests of a signal at different communication levels, the signal representing a first communication line and each communication level representing a communication format at a predetermined speed, said GUI comprising:

a primary screen for simultaneously displaying tests of a first communication level contained in the first communication line, a second communication level contained in the first communication line, a third communication level contained in the first communication line, and a fourth communication level contained in the first communication line; and a plurality of secondary screens which allow a user of the communication test set to select test results that are displayed on the primary screen.

10. The programmable GUI of claim 9 wherein said primary screen further comprises:

a first subscreen for displaying test results of the first communication level contained in the first communication line;

a second subscreen for displaying test results of the second communication level contained in the first communication line;

a third subscreen for displaying test results of the third communication level contained in the first communication line; and a fourth subscreen for displaying test results of the fourth communication level contained in the first communication line.

11. The programmable GUI of claim 10, wherein one of said plurality of subscreens allows the user to select one group of test results from a plurality of groups of test results.

12. In a communication test device, a method of displaying test results of a first communication line, comprising:

displaying in a first screen test results of a first communication format of a first communication line being tested, the first communication line containing:

a second communication format multiplexed into the first communication format and having a lower speed than the first communication format, a third communication format multiplexed into the second communication format and having a lower speed than the second communication format, and a fourth communication format multiplexed into the third communication format and having a lower speed than the third communication format;

displaying in a second screen test results of the second communication format contained in the first communication line;

displaying in a third screen test results of the third communication format contained in the first communication line;

displaying in a fourth screen test results of the fourth communication format contained in the first communication line;

wherein the first, second, third and fourth screens are simultaneously displayed.

13. The method according to claim 12, further comprising updating the test results of the first, second, third and fourth formats of the first communication line at a predetermined interval.

14. The method according to claim 12, further comprising:

selecting by a user the test results to be dispplayed in at least one of the screens; and storing the user selected test results for later retrieval.

* * * * *